United States Patent
Yoshida et al.

(10) Patent No.: US 7,848,184 B2
(45) Date of Patent: Dec. 7, 2010

(54) REPRODUCING METHOD FOR REPRODUCING REAL TIME DATA FROM A DISK-SHAPED INFORMATION RECORDING MEDIUM

(75) Inventors: Shuichi Yoshida, Osaka (JP); Tatsushi Bannai, Sakai (JP); Yoshiho Gotoh, Osaka (JP); Takashi Kishimoto, Nara (JP)

(73) Assignee: Panasonic Corporation, Osaka (JP)

(*) Notice: Subject to any disclaimer, the term of this patent is extended or adjusted under 35 U.S.C. 154(b) by 78 days.

(21) Appl. No.: 12/398,591

(22) Filed: Mar. 5, 2009

(65) Prior Publication Data
US 2009/0175137 A1 Jul. 9, 2009

Related U.S. Application Data

(62) Division of application No. 10/523,612, filed as application No. PCT/JP03/09859 on Aug. 4, 2003, now Pat. No. 7,512,040.

(30) Foreign Application Priority Data
Aug. 8, 2002 (JP) .............. 2002-231385

(51) Int. Cl.
*G11B 21/08* (2006.01)
(52) U.S. Cl. .................. 369/30.23; 369/47.33
(58) Field of Classification Search .......... 369/30.23, 369/30.24, 47.32, 47.33, 47.34, 30.1–30.17, 369/30.18; 711/102, 111, 112, 113, 4; 386/111, 386/46, 109, 113, 125, 126
See application file for complete search history.

(56) References Cited

U.S. PATENT DOCUMENTS

| | | | |
|---|---|---|---|
| 5,313,443 A | 5/1994 | Iitsuka | |
| 5,834,913 A | 11/1998 | Yoshida et al. | |
| 5,995,318 A | 11/1999 | Hasegawa et al. | |
| 6,567,350 B1 | 5/2003 | Takagi et al. | |

(Continued)

FOREIGN PATENT DOCUMENTS

EP 0 866 460 9/1998

(Continued)

OTHER PUBLICATIONS

International Search Report issued Oct. 14, 2003 in the International (PCT) Application No. PCT/JP2003/009859.

(Continued)

*Primary Examiner*—Tan X Dinh
(74) *Attorney, Agent, or Firm*—Wenderoth, Lind & Ponack, L.L.P.

(57) ABSTRACT

A standard reproduction model for ensuring real time reproducing on a disk-shaped information recording medium, includes a pickup (102) that reads the real time data from the information recording medium, a buffer memory (103) that temporarily stores the real time data read by the pickup, and a decoding module (104) that reads the real time data from the buffer memory (103) and processes the read real time data. An access time Tacc of the standard reproduction model is expressed by the following formula, $$Tacc = A \cdot dN + Trev + B$$

where dN is a difference in rotational speed of the disk-shaped information recording medium, Trev is a rotation waiting time at a target access position, A and B are constants.

2 Claims, 8 Drawing Sheets

U.S. PATENT DOCUMENTS

| | | |
|---|---|---|
| 6,839,504 B1 | 1/2005 | Gotoh et al. |
| 6,947,354 B2 | 9/2005 | Yada et al. |
| 7,154,834 B2 | 12/2006 | Fontijn et al. |
| 7,233,553 B2 * | 6/2007 | Gotoh et al. ............. 369/30.23 |
| 7,324,416 B2 * | 1/2008 | Gotoh et al. ............. 369/47.32 |
| 7,366,066 B2 | 4/2008 | Nakamura et al. |
| 7,529,160 B2 * | 5/2009 | Gotoh et al. ............. 369/30.23 |
| 2001/0043800 A1 | 11/2001 | Gotoh et al. |
| 2004/0264327 A1 * | 12/2004 | Gotoh et al. ............. 369/30.23 |
| 2007/0206465 A1 * | 9/2007 | Gotoh et al. ............. 369/47.32 |

FOREIGN PATENT DOCUMENTS

| | | |
|---|---|---|
| EP | 0 905 699 | 3/1999 |
| EP | 1 089 275 | 4/2001 |
| JP | 6-318366 | 11/1994 |
| JP | 8-203204 | 8/1996 |
| JP | 8-273291 | 10/1996 |
| JP | 10-97772 | 4/1998 |
| JP | 2000-113584 | 4/2000 |
| JP | 2001-52436 | 2/2001 |
| JP | 3171584 | 3/2001 |
| JP | 2002-124019 | 4/2002 |
| JP | 2002-157829 | 5/2002 |
| JP | 2002-190182 | 7/2002 |

OTHER PUBLICATIONS

Supplementary European Search Report issued Jan. 23, 2007 in Application No. EP 03 78 4512.

* cited by examiner

REPRODUCING METHOD FOR REPRODUCING REAL TIME DATA FROM A DISK-SHAPED INFORMATION RECORDING MEDIUM

This application is a Divisional of Application Ser. No. 10/523,612, filed Sep. 14, 2005 now U.S. Pat. No. 7,512,040, which is the National Stage of International Application No. PCT/JP2003/009859, filed Aug. 4, 2003.

TECHNICAL FIELD

The present invention relates to a disk-shaped information recording medium such as a rewritable optical disk for recording or reproducing real time data such as video, audio or the like. The present invention also relates to a method and apparatus for recording or reproducing data to/from the information recording medium.

BACKGROUND ART

Figure 8A:
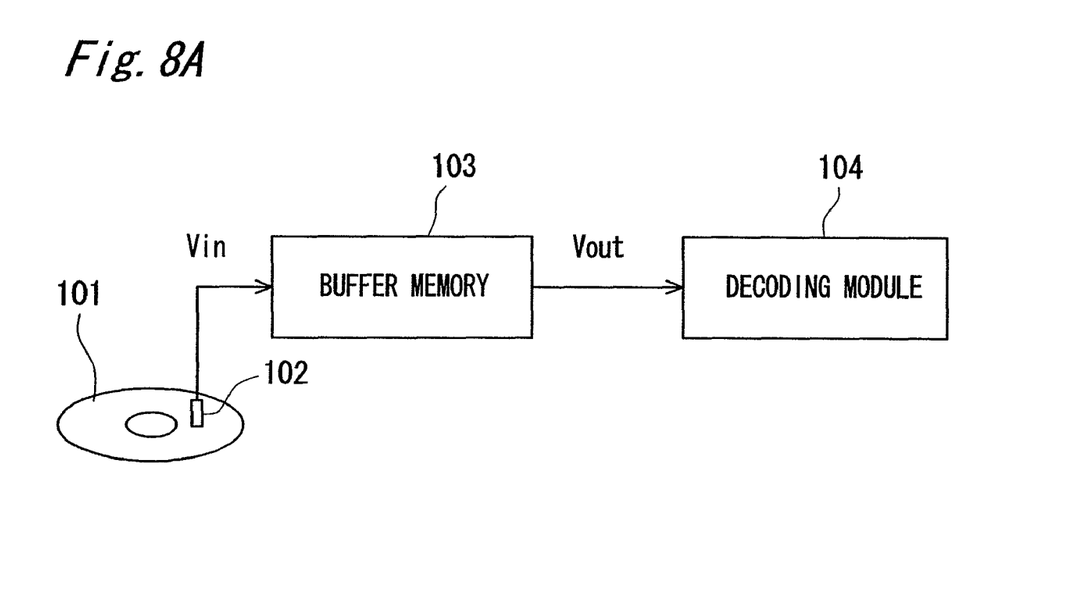
FIG. 8A is a diagram showing a structure of a conventional standard reproduction model.

There has conventionally been a DVD-RAM as an information recording medium for recording or reproducing real time data such as a video, audio or the like on a disk, one example of which is disclosed in Japanese Patent No. 3171584. This example defines a standard reproduction model shown in FIG. 8A for securing a real time reproduction of data discretely stored on a disk, and sets an access performance model shown in FIG. 8B for providing a relationship between an access distance and access time as the standard reproduction model. The standard reproduction model is formed in order to determine a condition that various types of reproducing apparatuses can continuously reproduce real time data on an optical disk. In order to reproduce real time data on the standard reproduction model, a data storage area is set in advance in accordance with the access performance model shown in FIG. 8B so that data in a buffer memory 103 does not underflow during an access and thus the reproduced video or audio is not broken off. The real time data is arranged at the set storage area and then is recorded thereto. As described above, data-recording is performed to the storage area that satisfies the access performance model, such that the real time data can continuously be reproduced according to setting of the standard reproduction model upon the subsequent reproduction.

DISCLOSURE OF THE INVENTION

However, in the conventional recording or reproducing method, the setting of the access performance model in the standard reproduction model is not so highly precise with respect to the actual characteristics of the access distance and access time, so that there is a problem that a loss of access time occurs during the reproduction thereby causing an underflow of the data in the buffer memory 103.

Figure 8B:
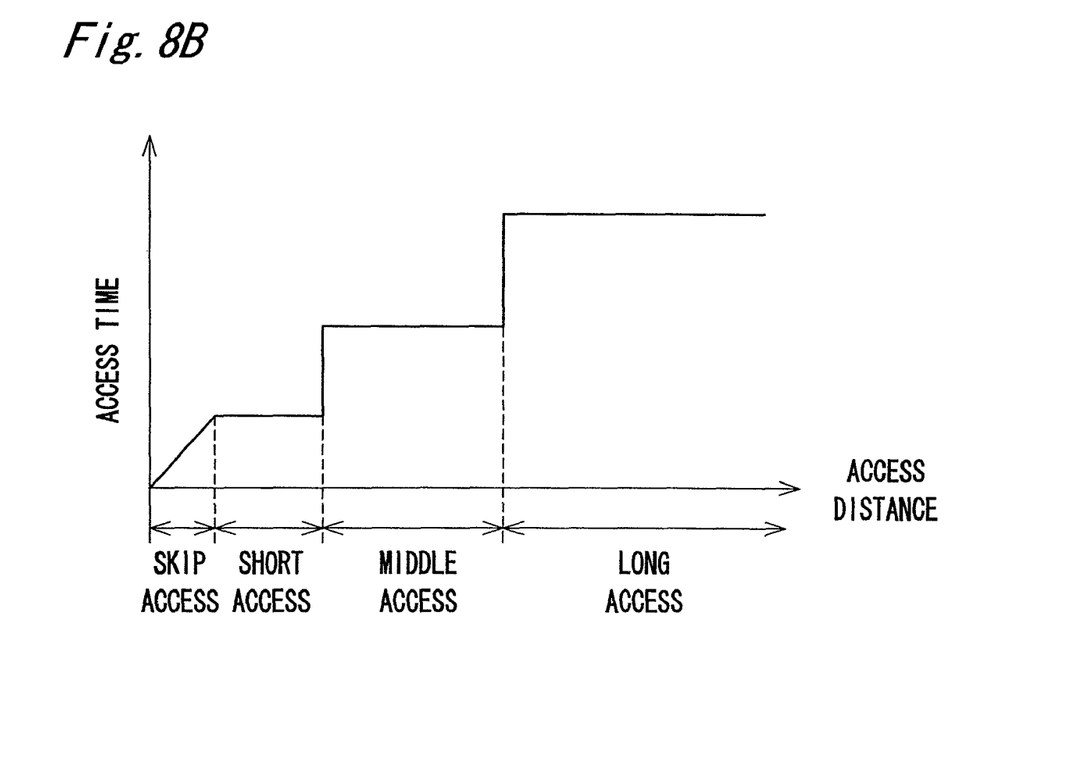
FIG. 8B is a diagram showing an access performance of the conventional standard reproduction model.

Specifically, the conventional access performance model shown in FIG. 8B is arranged such that a range to be accessed is divided into some sections and the access time is set to be constant among the sections or the access time is set in proportion to the access distance. However, the relationship between the access distance and access time is actually non-linear, thereby the setting is relatively low with respect to the inherent access performance in the conventional standard reproduction model. Thus a great loss in the access time occurs in the case of real access.

In view of the problem of the conventional recording or reproducing method, the present invention is directed to achieve an effective real time recording by enhancing a precision in setting of the access performance model.

In a first aspect of the invention, provided is a recording method for recording a real time file including real time data to a disk-shaped information recording medium so that the real time data can be continuously reproduced while the real time data is reproduced according to a standard reproduction model.

The standard reproduction model includes a pickup that reads the real time data from the disk-shaped information recording medium, a buffer memory that temporarily stores the real time data read by the pickup, and a decoding module that reads the real time data from the buffer memory and processes the read real time data.

Access performance of the standard reproduction model is provided by the following formula.

$$Tacc = A \cdot dN + Trev + B$$

Tacc is an access time that is a time required for the pickup to move from one area to another area. dN is a difference in rotational speed of the disk-shaped information recording medium before and after the movement of the pickup. Trev is a rotation waiting time at a target access position. A and B are constants.

The recording method includes the steps of searching, from a plurality of logically continuous unused areas in the disk-shaped information recording medium, an area, as a data recording area, that satisfies a real time reproducing condition which is a reproducing condition to prevent underflow during data reproduction operation, and recording the real time data to the searched data recording area. The real time reproducing condition is determined based on the access performance of the standard reproduction model.

In a second aspect of the invention, provided is an information recording apparatus for recording a real time file including real time data to a disk-shaped information recording medium so that the real time data can be continuously reproduced while the real time data is reproduced according to a standard reproduction model.

The standard reproduction model includes a pickup that reads the real time data from the disk-shaped information recording medium, a buffer memory that temporarily stores the real time data read by the pickup, and a decoding module that reads the real time data from the buffer memory and processes the read real time data. Access performance of the standard reproduction model is provided by the following formula.

$$Tacc = A \cdot dN + Trev + B$$

Tacc is an access time that is a time required for the pickup to move from one area to another area. dN is a difference in rotational speed of the disk-shaped information recording medium before and after the movement of the pickup. Trev is a rotation waiting time at a target access position. A and B are constants.

The apparatus includes a section operable to search, from a plurality of logically continuous unused areas in the disk-shaped information recording medium, an area, as a data recording area, that satisfies a real time reproducing condition which is a reproducing condition to prevent underflow during data reproduction operation, and a section operable to record the real time data to the searched data recording area. The real time reproducing condition is determined based on the access performance of the standard reproduction model.

In a third aspect of the invention, a reproducing method for reproducing real time data from a disk-shaped information recording medium is provided. The disk-shaped information recording medium is recorded with a real time file including the real time data so that the real time data can be continuously reproduced while the real time data is reproduced according to a standard reproduction model.

The standard reproduction model includes a pickup that reads the real time data from the disk-shaped information recording medium, a buffer memory that temporarily stores the real time data read by the pickup, and a decoding module that reads the real time data from the buffer memory and processes the read real time data. Access performance of the standard reproduction model is provided by the following formula.

$$Tacc = A \cdot dN + Trev + B$$

Tacc is an access time that is a time required for the pickup to move from one area to another area. dN is a difference in rotational speed of the disk-shaped information recording medium before and after the movement of the pickup. Trev is a rotation waiting time at a target access position. A and B are constants.

The reproducing method includes the steps of reading the real time data from the disk-shaped information recording medium, storing temporarily the read real time data to the buffer memory, reading the real time data stored in the buffer memory and decoding the read real time data by the decoder, and after completion of access to previous real time data, accessing the next real time data within the access time Tacc.

In a fourth aspect of the invention, a reproducing apparatus for reproducing real time data from a disk-shaped information recording medium is provided. The disk-shaped information recording medium is recorded with a real time file including the real time data so that the real time data can be continuously reproduced while the real time data is reproduced according to a standard reproduction model.

The standard reproduction model includes a pickup that reads the real time data from the disk-shaped information recording medium, a buffer memory that temporarily stores the real time data read by the pickup, and a decoding module that reads the real time data from the buffer memory and processes the read real time data. Access performance of the standard reproduction model is provided by the following formula.

$$Tacc = A \cdot dN + Trev + B$$

Tacc is an access time that is a time required for the pickup to move from one area to another area. dN is a difference in rotational speed of the disk-shaped information recording medium before and after the movement of the pickup. Trev is a rotation waiting time at a target access position. A and B are constants.

The reproducing apparatus includes a data reproducing section operable to read the real time data from the disk-shaped information recording medium, a buffer memory operable to store temporarily the read real time data, and a decoder operable to read the real time data stored in the buffer memory and decode the read real time data. The data reproducing section, after completion of access to previous real time data, accesses the next real time data within the access time Tacc.

In a fifth aspect of the invention, provided is a disk-shaped information recording medium to which a real time file including the real time data is recorded so that the real time data can be continuously reproduced when the real time data is reproduced according to a standard reproduction model.

The standard reproduction model includes a pickup that reads the real time data from the disk-shaped information recording medium, a buffer memory that temporarily stores the real time data read by the pickup, and a decoding module that reads the real time data from the buffer memory and processes the read real time data. Access performance of the standard reproduction model is provided by the following formula.

$$Tacc = A \cdot dN + Trev + B$$

Tacc is an access time that is a time required for the pickup to move from one area to another area. dN is a difference in rotational speed of the disk-shaped information recording medium before and after the movement of the pickup. Trev is a rotation waiting time at a target access position. A and B are constants.

The real time data is recorded on an area in a plurality of logically continuous unused areas in the disk-shaped information recording medium, that satisfies a real time reproducing condition which is a reproducing condition to prevent underflow during the data reproduction operation. The real time reproducing condition is determined based on the access performance of the standard reproduction model.

According to the present invention, in a recording or reproducing method of a disk-shaped information recording medium, information recording apparatus and information reproducing apparatus, as to the setting of a access performance model, the formula of access performance is made approximate by using the characteristic of the spindle motor and the rotation waiting time, while paying attention to the a difference in rotational speed of the disk-shaped information recording medium after and before the movement of the pickup. Thus an accurate access operation of the drive can be estimated, thereby realizing a sure real time recording.

BEST MODES FOR CARRYING OUT THE INVENTION

Preferred embodiments of the present invention will be explained hereinbelow with reference to the drawings.

Figure 1A:
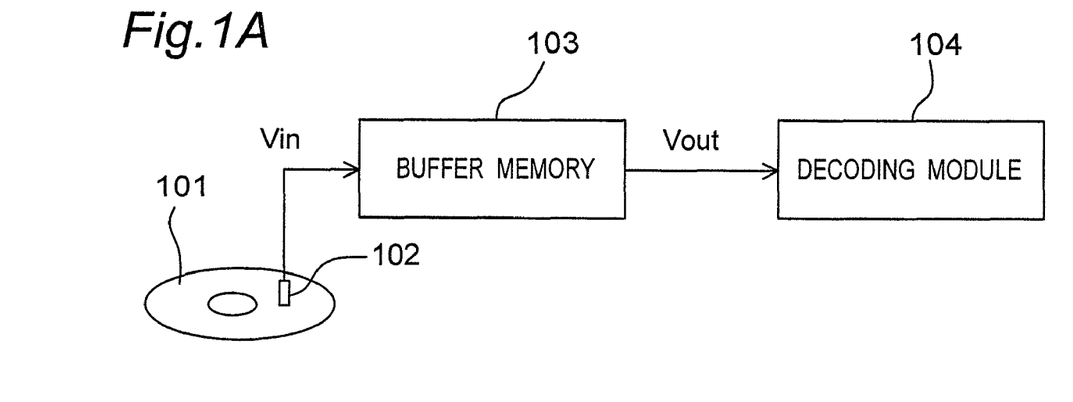
FIG. 1A is a diagram showing a structure of a standard reproduction model of the present invention.
Figure 1B:
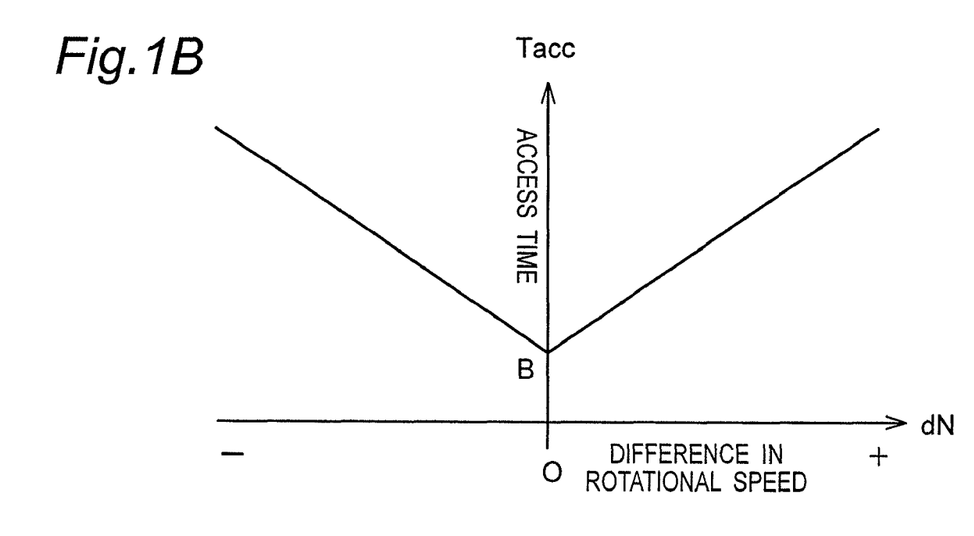
FIG. 1B is a diagram showing access performance of the standard reproduction model of the present invention.

FIG. 1A is a diagram showing a standard reproduction model for deciding an arrangement condition of real time data according to the present invention, while FIG. 1B is a diagram showing its access performance. The standard model shown in FIG. 1A includes a disk 101, a pickup 102 that reads out data from the disk 101, a buffer memory 103 that temporarily stores the read out data and a decoding module 104 that decodes the data transferred from the buffer memory 103. Vin is a data rate upon transferring the data from the disk 101 to the buffer memory 103. Vout is a data rate upon transferring the data from the buffer memory 103 to the decoding module 104. The value of Vin is set to a value greater than the maximum data rate (Vout) of real time data assumed in an application.

FIG. 1B is a diagram showing a relationship between an access time and a difference in rotational speeds of a spindle motor, that is, in the rotational speeds of the disk upon access of the pickup 102 in the standard reproduction model. In the present embodiment, the rotational speed of the disk is controlled in a CLV (Constant Linear Velocity) method, thereby the rotational speed of the disk differs in case where the area to be accessed differs in the radius direction. In FIG. 1B, the difference in the rotational speed of the disk is a difference between the rotational speeds before and after the movement when the pickup 102 moves from one area to another area. In FIG. 1B, an access performance model is set from the relationship between the access time and the difference in the rotational speed of the disk based on a formula (I) described later, going on the assumption as described below.

Figure 2A:
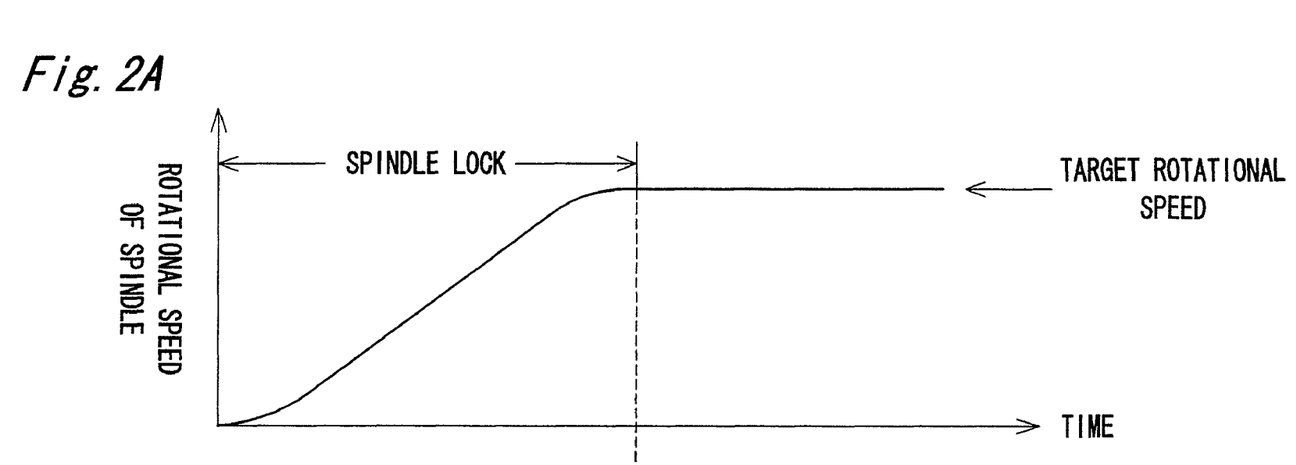
FIG. 2A is a diagram showing a relationship between an access time and a spindle rotational speed.
Figure 2B:
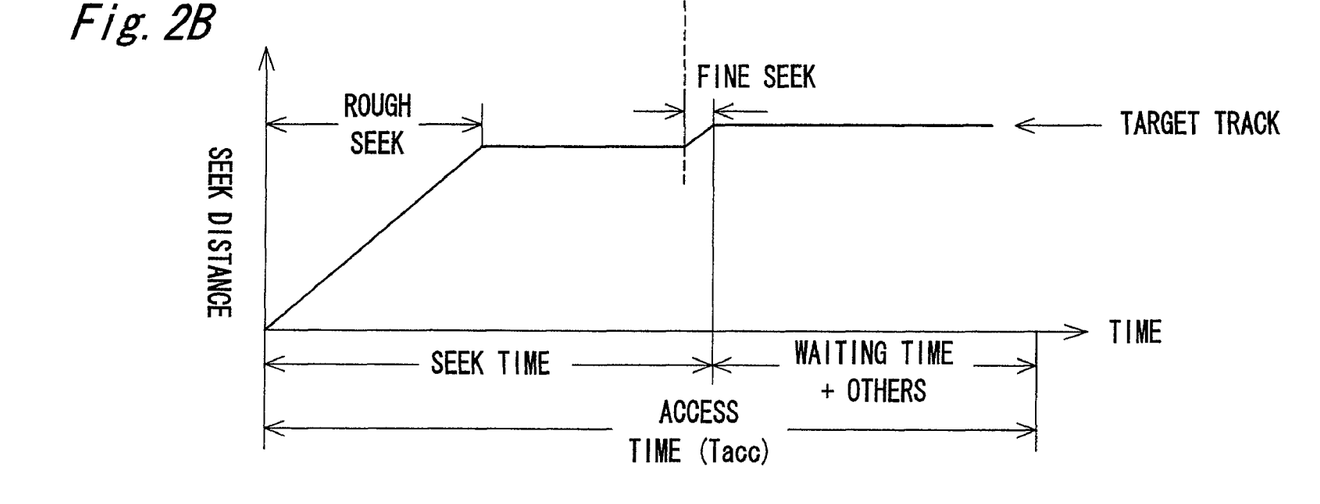
FIG. 2B is a diagram showing a relationship between an access time and a seek distance.

As shown in FIG. 2B, a seek for moving the pickup 102 in the radius direction of the disk 101 is required for the access of the pickup 102, and further, it is required that the rotational speed of the spindle motor that rotates the disk is changed to the target rotational speed as shown in FIG. 2A. The seek is classified into a rough seek for moving the pickup to the vicinity of the target track and a fine seek for performing a fine adjustment after the rough seek to move the pickup to the target track. In FIG. 2B, it is possible to set a time required for the rough seek so as to be sufficiently smaller than a time required for changing the rotational speed of the spindle motor, thereby the time required for changing the spindle rotational speed becomes dominant in the access time in the performance of the spindle motor used in an optical disk drive.

A torque Trq of the motor is generally represented by the following formula;

$$Trq = (N1-N2) \cdot J/(dt \cdot Kj)$$

where J: inertia of the disk, dt: spindle lock time, Kj: conversion constant, N1: rotational speed before the movement, N2: rotational speed after the movement.

Paying attention to the fact that the spindle lock time is proportional to the rotational speed difference before and after the movement, the access time Tacc can be formalized as the following formula (1);

$$\begin{aligned} Tacc &= \text{(spindle lock time)} + \text{(rotation waiting time)} + \text{(other time)} \quad (1) \\ &= (N1-N2) \cdot J/(Trq \cdot Kj) + Trev + B \\ &\approx A \cdot dN + B \end{aligned}$$

where N1: initial rotational speed, N2: target rotational speed, dN: difference in rotational speed (=N1−N2), J: disk inertia, Trq: motor torque, Kj: conversion constant, Trev: average rotation waiting time, A, B: constant.

In the formula (1), the rotation waiting time Trev can be omitted if it is sufficiently smaller than the spindle lock time A·dN.

The following is the case where specific numerals are applied to the relational expression shown by the formula (I). When N1=3000 rpm, N2=1000 rpm, dN=2000 rpm, J=300 gf·cm·cm, Trq=100 gf·cm and Kj=9350, then A·dN=0.641 sec. On the other hand, the average rotation waiting time Trev in the target rotational speed N2 is 0.03 (=60/1000/2) sec, which is sufficiently small compared to the spindle lock time A·dN. Further, when the constant B=0.1, the access time Tacc obtained by adding these is 0.771 sec.

From the formula (I), the access time Tacc can be estimated to be linear with respect to the difference in the rotational speed of the disk dN, when the rotation waiting time Trev is sufficiently small. From this, the access performance model shown in FIG. 1B is supposed. On the other hand, if the initial position and target position of the pickup are known, the rotational speed of the disk and the difference in the rotational speed can be obtained from the relationship between the linear speed of the disk and the initial position and target position.

When moving one region to another region, if the original address is A1, the destination address is A2, the respective radius positions are r1 and r2, and the radius position for the address of 0 is r0, then the addresses A1 and A2 are represented by the following formula with C as a constant since they are proportional to a band-like area.

$$A1 = C \cdot (\pi \cdot r1^2 - \pi \cdot r0^2)$$

$$A2 = C \cdot (\pi \cdot r2^2 - \pi \cdot r0^2)$$

Since the rotational speed at a certain address is inversely proportional to a radius of the address, the rotational speeds can be obtained from the address by using the above-mentioned formulas, when the rotational speeds at A1 and A2 are N1 and N2 and D is constant and N1=D/r1 and N2=D/r2.

Therefore, the formula (1), that is, the access performance model shown in FIG. 1B is established with respect to the optional initial position and target position of the pickup. It should be noted that, when the access distance is small, dN becomes small so that Trev becomes dominant. In this case, Trev can be calculated according to the position of the pickup, thereby allowing the access performance to be calculated accurately.

The conventional access performance model shown in FIG. 8B is arranged such that a range to be accessed is divided into some sections and the access time is set to be constant among the sections or the access time is set in proportion to the access distance. Therefore, the setting is relatively low with respect to the inherent access performance, thereby causing a great loss in the actual access time. On the contrary, in the access performance model of the present invention, the access time can be obtained with enhanced precision according to the actual access model in all access areas.

Subsequently, when the data is read according to the standard reproduction model shown in FIG. 1A, the data is accumulated in the buffer memory 103 at a rate of (Vin−Vout), the data cannot be read while the pickup 102 is moved, and thus the data in the buffer is consumed at a rate of Vout. To the operation model, the change in the data amount in the buffer memory 103 in case where the standard reproduction model reproduces the real time data can be quantitatively calculated by using the specific access time. Accordingly, when the standard reproduction model reproduces the real time data, the real time data can continuously be reproduced if the data recording areas are arranged on the disk 101 such that the data in the buffer memory 103 does not underflow. Therefore, regarding data recording, the arrangement condition of areas (hereinafter referred to as "real time extent") in which the real time data should be recorded is defined based on the above-mentioned access performance model.

Figure 3A:
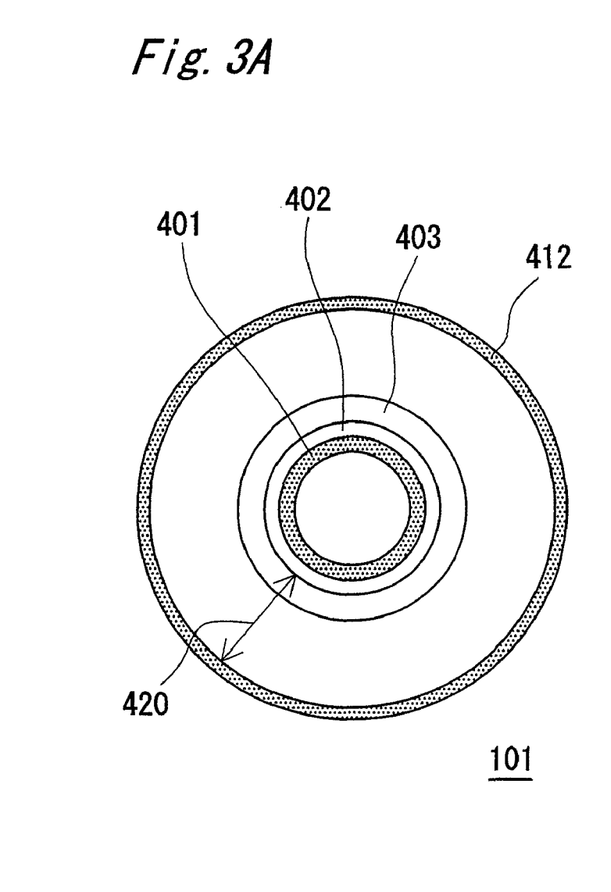
FIG. 3A is a diagram showing a physical format of a rewritable optical disk according to one embodiment of the present invention.
Figure 3B:
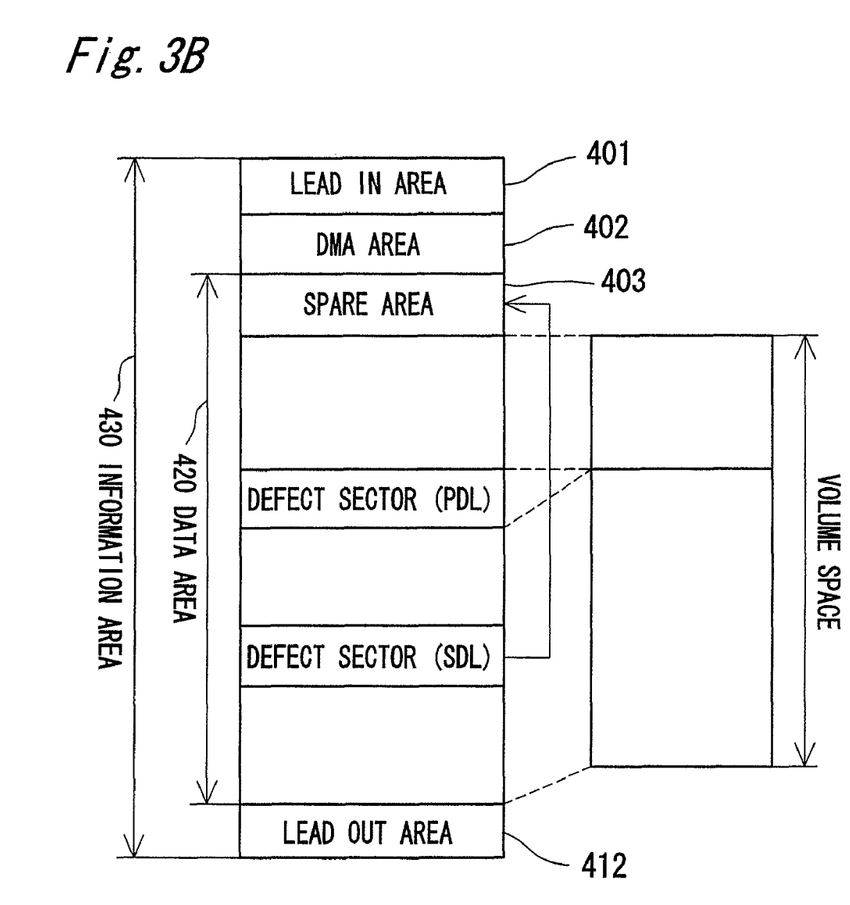
FIG. 3B is a diagram of data structure showing a data area of the rewritable optical disk.

With reference to FIGS. 3A and 3B, a physical layout of a CLV formatted rewritable optical disk used in the present embodiment is explained below.

In FIG. 3A, a rewritable optical disk 101 has, from its inner periphery, a lead in area 401, DMA (Defect Management Area) 402 for managing a defective sector on the disk, data area 420 and lead out area 412. Digital data is recorded in each area, wherein the digital data is managed with a unit called "sector". The data area 420 includes a spare area 403 for a replacing process of defective sectors.

As shown in FIG. 3B, the information area of the rewritable optical disk 101 is provided with a physical sector number every physical sector from its inner periphery. On the other hand, the area in which user data can be recorded is defined as a volume space to which a logical sector number is provided every logical sector. The volume space is a space provided by excluding, from the information area, the lead in area 401, DMA area 402, unused area in the spare area 403, defective sectors registered in PDL (Primary Defective List) in the DMA and the lead out area 412.

A certifying process is executed upon initialization of the optical disk 101. When a defective sector is detected by this certifying process, the defective sector is registered in the PDL. A logical sector number is not allocated to the defective sector. In this case, even if the logical addresses of sectors are consecutive, they physically include a discrete area. Therefore, a seek is required to be performed in case where the section before and after the discrete area is recorded or reproduced. The defective sector detected during the data recording is replaced by the spare area 403 and registered in SDL (Secondary Defective List) in the DMA area 402.

Figure 4:
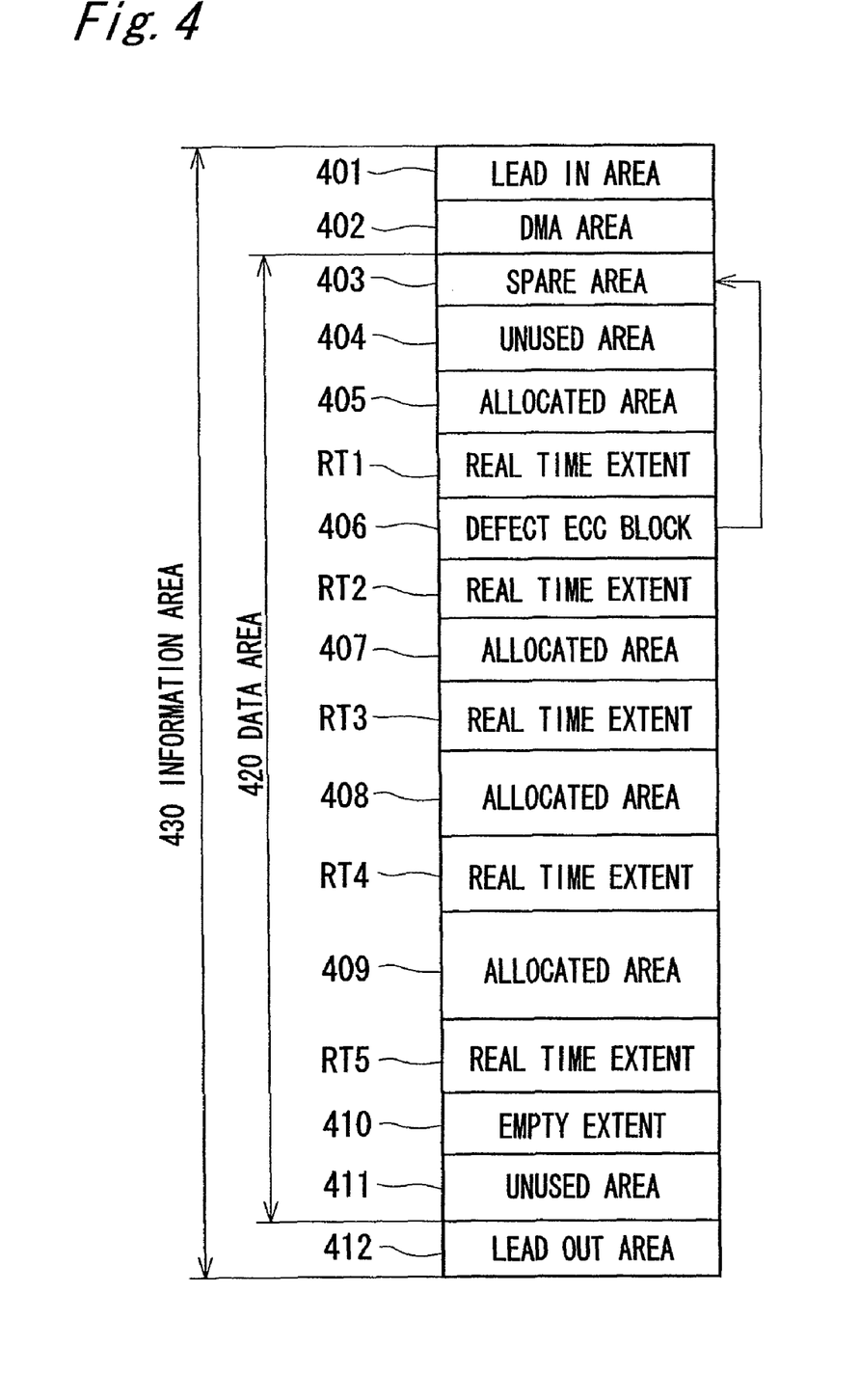
FIG. 4 is a diagram of data structure showing an area construction of an information recording medium.

FIG. 4 is a diagram showing a further detailed data structure of the rewritable optical disk in the present embodiment.

In FIG. 4, the information area 430 composed of the physical sectors includes the lead in area 401, DMA area 402, data area 420 and lead out area 412. The spare area 403 for alternately recording the defective sector or defective block is arranged at the head of the data area 420, and the following areas form the volume space.

In the data area 420, allocated areas 405, 407, 408 and 409 are areas where data is already recorded. A defective ECC block 406 is formed between a real time extent RT1 and real time extent RT2. Further, real time extents RT3, RT4 and RT5 are respectively formed subsequent to the allocated areas 407, 408 and 409. The defective ECC block 406 is a defective block detected during the data recording. The data that should be recorded originally in the defective ECC block 406 is alternately recorded in the spare area 403. An empty extent 410 and unused area 411 are formed after the real time extent RT5. The real time extents RT1 to RT5 are arranged here so as to satisfy a condition defined by the standard reproduction model having a predetermined access performance.

Figure 5:
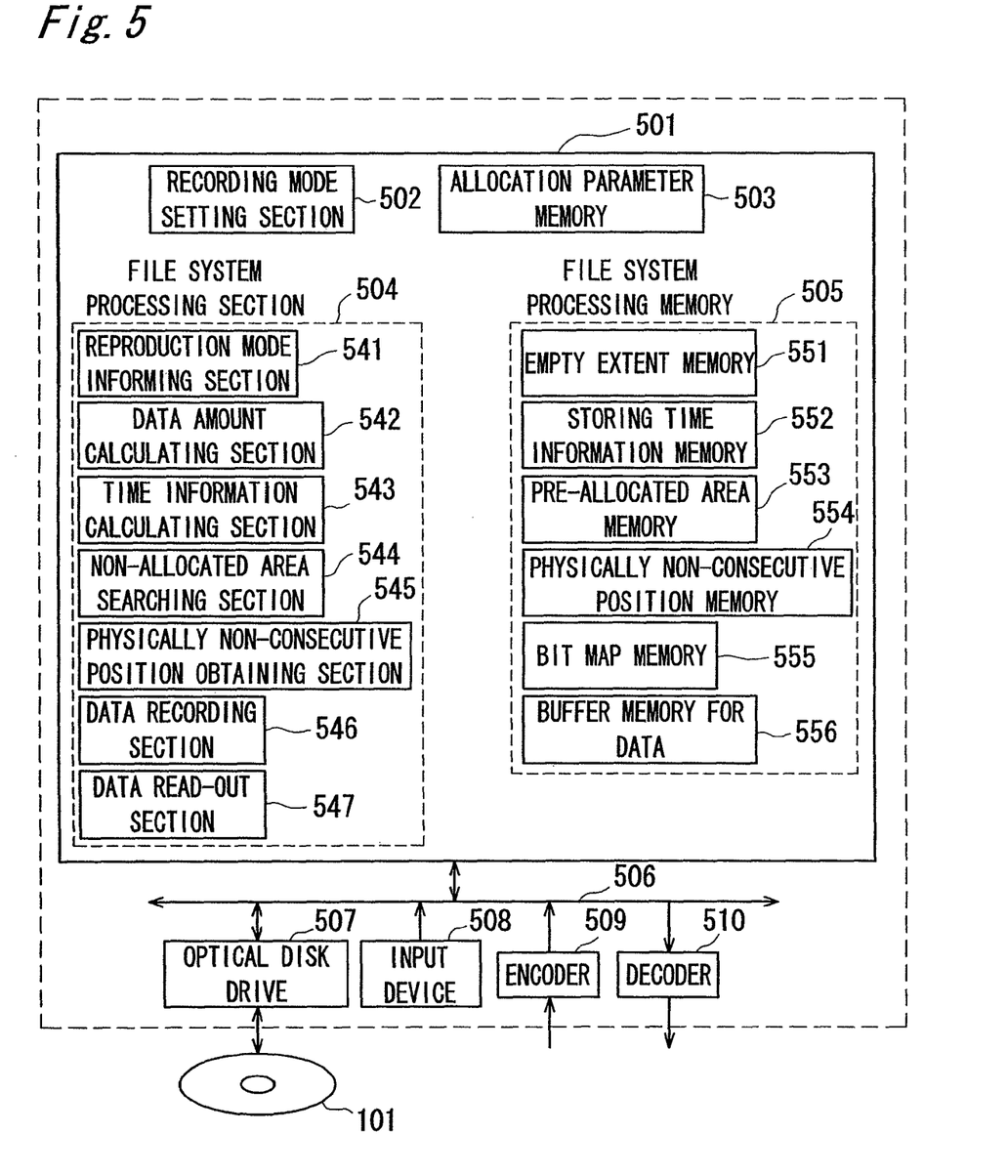
FIG. 5 is a block diagram of an information recording/reproducing apparatus of the present invention.

Subsequently, an information recording/reproducing apparatus of the present invention is explained below. FIG. 5 shows a block diagram of the information recording/reproducing apparatus. Explained below is a recording operation of a real time file to the optical disk 101 by the information recording/reproducing apparatus.

The information recording/reproducing apparatus includes a system controlling section 501, an I/O bus 506, an optical disk drive 507, an input device 508 such as a remote controller, mouse, keyboard or the like for inputting a recording mode or the like, an encoder 509 for encoding an audio/video signal into audio/video data (AV data) and a decoder 510 for decoding the AV data to be outputted.

The system controlling section 501 includes a recording mode setting section 502, a memory 503 for allocation parameter, a file system processing section 504 and a memory 505 for file system processing.

The file system processing section 504 includes a reproduction mode informing section 541, a data amount calculating section 542, a time information calculating section 543, a non-allocated area searching section 544, a physically non-consecutive position obtaining section 545, a data recording section 546 for controlling the data recording and a data read-out section 547 for controlling read-out operation of data. These sections utilizes the memory 505 for file system processing.

The file system processing memory 505 includes a memory 551 for storing positional information of an empty extent, a memory 552 for storing time information, a memory 553 for storing positional information of pre-allocated area, a memory 554 for storing positional information showing a physically non-consecutive position, a memory 555 for bit map and a buffer memory 556 for data.

The access performance of the optical disk drive 507 and data record performance realized by the data recording rate and the size of the buffer memory 556 for data satisfy the record performance realized on using the standard reproduction model shown in FIGS. 1A and 1B for data recording.

The information recording/reproducing apparatus having the above-mentioned structure performs a recording operation while satisfying the aforesaid standard reproduction model. The standard reproduction model presets the data storage area (empty extent/real time extent) according to the access performance model so that the data in the buffer memory 103 does not underflow during the reproduction, and records the data in the preset area, thereby allowing real time data to be reproduced continuously during the subsequent data reproduction.

The operation of the information recording/reproducing apparatus is explained below.

(Step 1) A recording mode and recording time are instructed from the input device 508. The recording mode setting section 502 determines a maximum transfer data rate Vout from the buffer memory 556 to the decoder 510, a read-out data rate Vin from the disk 101, a size SR of data to be recorded, a buffer size Bmax and other various access times, and stores those in the allocation parameter memory 503. The maximum data rate Vout is fixed and set to a value so that it is possible to keep recording operation at the maximum data rate.

(Step 2) The physically non-consecutive position obtaining section 545 instructs the optical disk drive 507 to inform the section 545 of the positional information of the defective sector or defective block registered in the PDL and SDL as the physically non-consecutive positional information on the disk 101. The physically non-consecutive positional information informed by the optical disk drive 507 is held in the physically non-consecutive position memory 554.

The non-allocated area searching section 544 searches non-allocated area that is physically consecutive in an ECC block unit on the disk as a pre-allocated area by using the positional information of the non-allocated area held in the bit map memory 555 and the non-consecutive positional information held in the physically non-consecutive position memory 554. The positional information of the searched pre-allocated area is stored in the pre-allocated area memory 553. This searching operation is executed until the total size of the searched pre-allocated areas exceeds the data size SR.

Figure 6A:
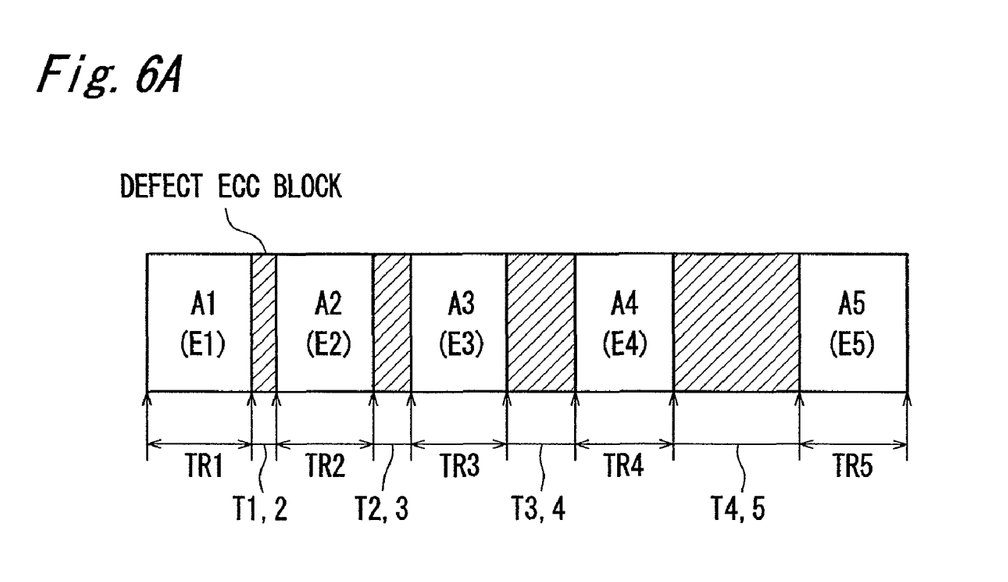
FIG. 6A is a diagram showing an area allocated for a real time file by a recording method of the present invention (before real time data recording).

FIG. 6A is a diagram showing an arrangement of the pre-allocated area obtained by searching the physically consecutive non-allocated area in the ECC block unit by the above-mentioned procedure. The pre-allocated areas A1 to A5 are allocated.

(Step 3) The time information calculating section 543 calculates a read-out time TRi (i corresponds to i of an area number Ai of the pre-allocated area shown in FIG. 6A) for reading each pre-allocated area with the data rate Vin, an access time Ti,i+1 for accessing an area between the pre-allocated areas (the time to access an area between the pre-allocated areas Ai and Ai+1 shown in FIG. 6A) by using the positional information of the pre-allocated area stored in the pre-allocated area memory 553 and various access times stored in the allocation parameter memory 503. In FIG. 6A, the read-out times TR1 to TR5 are times required for reading out the pre-allocated areas A1 to A5, respectively. Further, T1,2 is a read-out delay time by the defective ECC block. T2,3, T3,4 and T4,5 are times (access times) required for making an access to each allocated area between the pre-allocated areas A2 and A3, A3 and A4 and A4 and A5, respectively. These access times can be obtained from the access performance of the standard reproduction model shown in FIG. 1B. The obtained access time Ti,i+1 are held in the time information memory 552 together with the read-out time TRi.

(Step 4) Subsequently, the data amount calculating section 542 performs a calculation of the following steps by using the read-out time and the access time stored in the time information memory 552.

Figure 7:
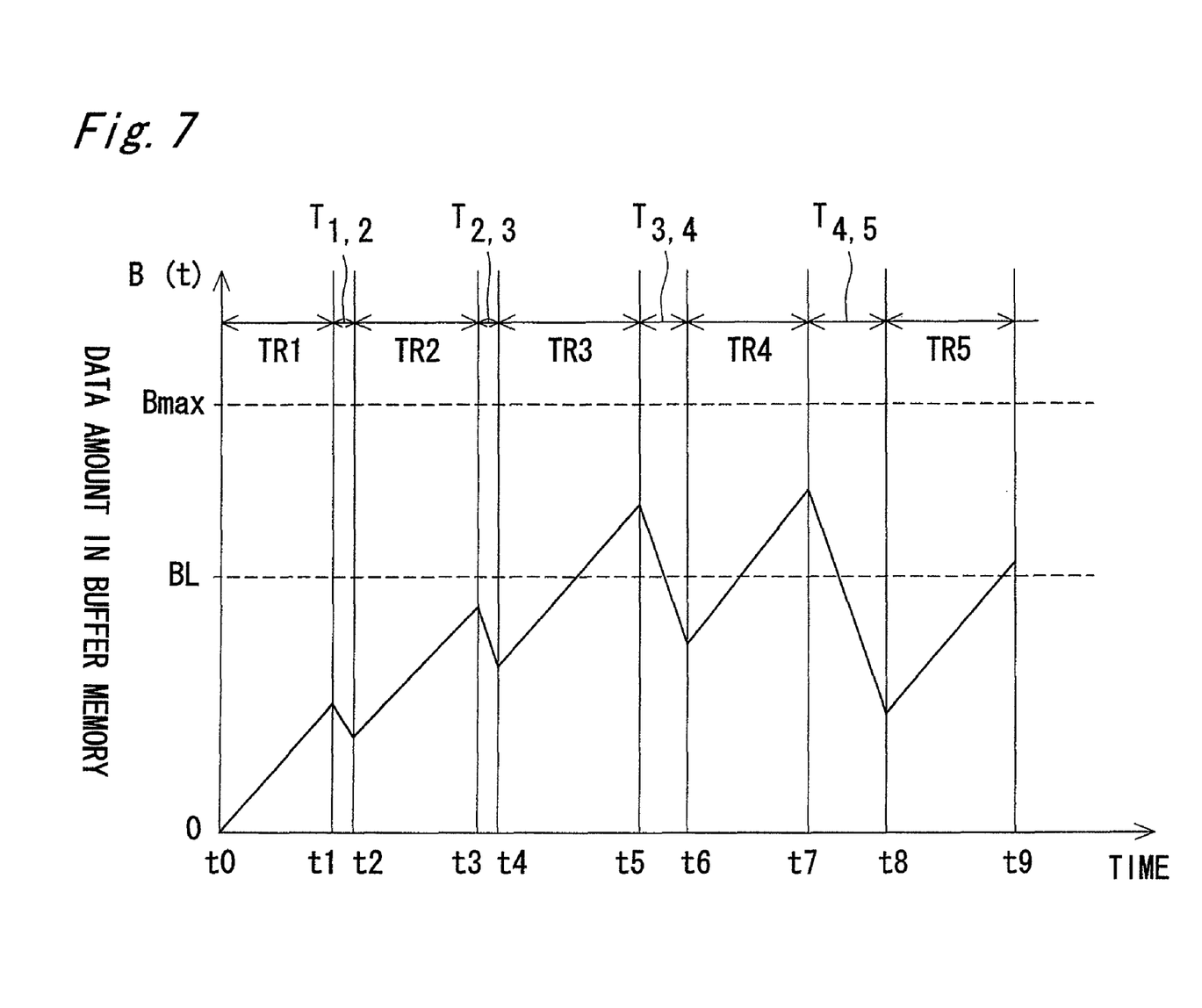
FIG. 7 is a diagram showing a change of data in a buffer memory calculated in the recording method of the present invention.

First, calculated is the data amount in the buffer memory 556 when the read-out of the pre-allocated area is completed. FIG. 7 shows a change in the data amount in the buffer memory 556 when the data in the pre-allocated area is read out. For example, the data amount increases with a data rate of (Vin−Vout) during a period TR1 at a time t1 after the pre-allocated area A1 is read out.

(Step 5) It is checked whether the calculated total data amount of the pre-allocated area exceeds the size SR set at the step 1. If it does not exceed the size SR, a check is made as to whether the calculated total data amount exceeds an allocation level BL (=Vout×TL, TL is a full stroke access time). When the data amount in the buffer exceeds the BL, the underflow does not occur even if an access is made from the terminal end of this pre-allocated area to any area on the disk. Therefore, the areas from the head pre-allocated area to the pre-allocated area having the total data amount not exceeding the size SR and exceeding the allocation level BL are fixed as the areas where the underflow does not occur, and these areas are registered as an empty extent where the real time data can be recorded.

(Step 6) Subsequently calculated is the data amount in the buffer memory 556 at the time of starting the read-out of the pre-allocated area. In FIG. 7 at a time t2 that is before the pre-allocated area A2 is read out, the data amount decreases with the data rate of Vout during the period T1,2.

(Step 7) It is checked whether the total data amount calculated becomes negative or not. The total data amount being negative means that the buffer causes an underflow by this access thereby breaking off the data. If it is not negative, the process returns to the head of (Step 4). In FIG. 6A, the pre-allocated areas A2 to A5 are calculated by repeatedly performing the process from (Step 4) to (Step 6). During this period, the data amount exceeds the allocation level BL at each period of TR3, TR4 and TR5 shown in FIG. 7. Thus the pre-allocated areas A1 to A5 are successively allocated as empty extents E1 to E5 as shown in FIG. 6A, and the positional information thereof is stored in the empty extent memory 551. The empty extent is an area reserved for recording the real time data, but an area where data is not recorded yet.

According to the above-mentioned steps, the areas (empty extents E1 to E5) in which the real time data can be recorded are obtained.

(Step 8) Subsequently, a procedure for recording data on an information recording medium is explained. The video/audio signal input to the information recording/reproducing apparatus is encoded into AV data in a variable length compression method and then transferred to the buffer memory 556 by the encoder 509. The data recording section 546 records the AV data to the empty extents E1 to E5 already allocated.

Figure 6B:
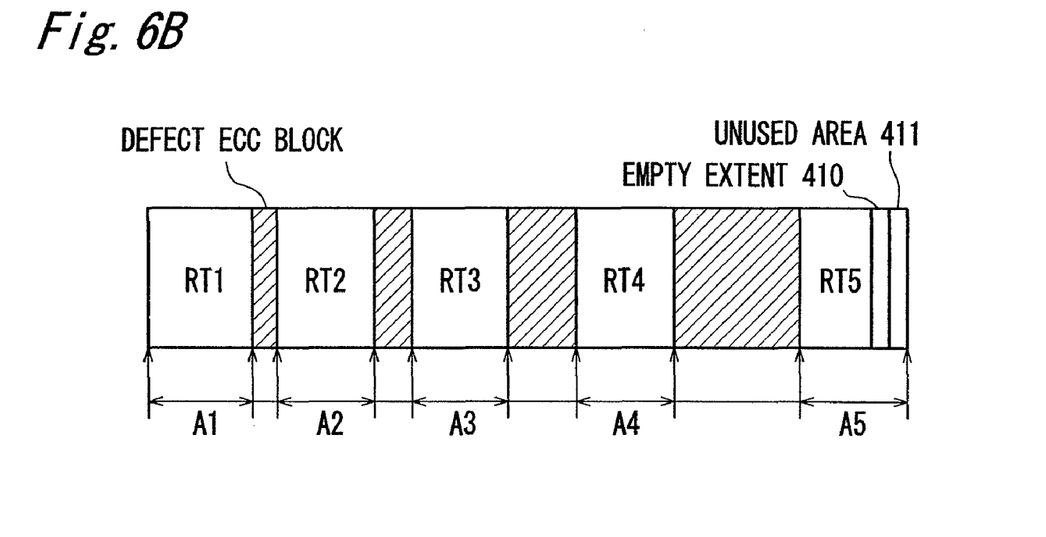
FIG. 6B is a diagram showing an area allocated for a real time file by a recording method of the present invention (after real time data recording).

As shown in FIG. 6B, each empty extent is recorded with data thus to become a real time extent. Since the empty extents E1 to E5 are allocated with the fixed data rate Vout capable of handling the highest video and audio quality, a part of the areas remains to be unused when the recording of the AV data is completed. Specifically, in the empty extent E5, the area in which the data is recorded is defined as a real time extent RT5. Further, in the empty extent E5, the area which includes an end of the recorded AV data and in which the AV data is not recorded on only a part of the ECC block is defined as an empty extent 410, while the area in which the AV data is not recorded in the ECC block unit is defined as an unused area 411.

Next, a reproducing operation of a real time file from the optical disk 101 by the information recording/reproducing apparatus is explained.

The real time data is recorded on the area of the optical disk 101 that satisfies the real time reproducing condition. The data reading section 547 reads out the real time data from the optical disk 101. For successively reading out the real time data, the data reading section 547 accesses first (previous) real time data, and subsequently accesses the next real time data within the access time Tacc to read out the data. The read-out real time data is temporarily stored in the buffer memory 556. The real time data stored in the buffer memory 556 is then decoded via the decoder 510 which is defined as a decoding module in the standard reproduction model, thereby reproducing video and audio. The real time data arranged so as to satisfy the real time reproducing condition satisfies the specified performance, thereby enabling a continuous data reproduction.

The functions of the embodiment of the present invention may be realized by a hardware, but a part or whole of the process may be implemented by a software for a microcomputer.

The characteristic data such as constants A, B, Trev and the like in the formula (I) relates to a basic performance of the optical disk drive 507. Specifically, the constant A includes a torque value Trq of the spindle motor. This value depends on the access performance of the optical disk drive 507. Further, the average rotation waiting time Trev in the formula (I) depends on a drive performance, that is, how fast the recording/reproducing speed of the optical disk drive 507 is, for example, a normal speed, twofold speed or more-fold speed. Further, the constant B relates to a drive performance of the optical disk drive 507 such as a time required for issuing a command of an interface or a time required for ECC decode. These characteristic data may be stored in advance in a nonvolatile memory (not shown) of the system controlling section 501, for example. Afterwards, upon the apparatus and the system controlling section 501 being activated, the data may be read from the nonvolatile memory and the calculation may be done according to the formula (I), thereby constructing the standard reproduction model.

It should be noted that the constant A in the formula (I) includes the inertia J of the disk which may be varied depending on a manufacturing tolerance or the like of the disk. Therefore, when, for example, the disk is inserted into the recording/reproducing apparatus, the disk is rotated with a predetermined torque, and the inertia is estimated from the following formula based upon the time required for the above-mentioned operation. Then the constant A may be obtained based on the estimated value, and further the constant B may be estimated in advance. Such characteristic data can be stored in a nonvolatile memory (not shown) of the system controlling section 501.

$$J = dt \cdot Kj \cdot Trq/(N1-N2)$$

The characteristic data such as the constants A, B or Trev can be recorded on a specific area of the disk.

Further, when the optical disk to which data is recorded based on the above-mentioned characteristic data is reproduced, the recording/reproducing apparatus may read out the characteristic data from the optical disk, and compare the read characteristic data with the characteristic data value stored in advance therein corresponding to the performance of its optical disk drive. When the characteristic data read from the optical disk exceeds the performance of the drive, an alarm informing that the real time reproduction cannot be performed may be issued. This is because underflow may possibly occur due to impossibility of access with a predetermined access time.

Regarding derivation of the formula (I), detailed items such as at least a controlling method of accelerating or decelerating the spindle motor are omitted in consideration, but to be precise, the following formula may be used which can provide highly precise modelization;

$$Tacc = A \cdot dN + B + f(N)$$

where N: instantaneous rotational speed on acceleration and deceleration, f(N): function with respect to N.

In the rough seek shown in FIG. 2B, there may be the case where the access time can be estimated according to a trapezoidal speed profile of the movement of the pickup formed of an accelerating region with a constant acceleration, a constant speed region and a decelerating region with a constant deceleration. When the acceleration and deceleration are supposed to be 0.1 G and a constant speed is supposed to be 5 cm/sec, for example, the time required for the rough seek becomes dominant in the access time more than the time required for the spindle lock.

In the fine seek shown in FIG. 2B, the movement of a lens provided on the pickup may be estimated such that it moves with a constant time for every track, or it moves with a constant time at every specific number (tens to hundreds) of tracks.

INDUSTRIAL APPLICABILITY

The optical disk and recording/reproducing apparatus and method of the optical disk of the present invention can easily estimate an accurate access operation of the drive, thereby enabling a sure real time recording. Thus, they are applicable to a recording/reproducing method and apparatus of a rewritable optical disk for recording or reproducing real time data such as a video, audio or the like.

Although the present invention is explained about a specific embodiment, many other modifications, amendments, other uses are apparent for a person skilled in the art. Therefore, the present invention is not limited to the specific disclosure in the specification, but can be limited only by the appended claims. It should be noted that the present application relates to Japanese Patent Application No. 2002-231385 filed on Aug. 8, 2002, the disclosure of which is incorporated herein by reference.

The invention claimed is:

1. A reproducing method for reproducing real time data from a disk-shaped information recording medium, the disk-shaped information recording medium being recorded with a real time file including the real time data so that the real time data is continuously reproduced while the real time data is reproduced according to a reproduction model, wherein:

the reproduction model includes a pickup that reads the real time data from the disk-shaped information recording medium, a buffer memory that temporarily stores the real time data read by the pickup, and a decoding module that reads the real time data from the buffer memory and processes the read real time data, and access performance of the reproduction model is provided by the following formula, $$Tacc = A \cdot dN + Trev + B$$

where Tacc is an access time that is a time required for the pickup to move from one area to another area, dN is a difference in rotational speed of the disk-shaped information recording medium before and after the movement of the pickup, Trev is a rotation waiting time at a target access position, A and B are constants;

the reproducing method comprising the steps of:

reading the real time data from the disk-shaped information recording medium, storing temporarily the read real time data to the buffer memory, reading the real time data stored in the buffer memory and decoding the read real time data by the decoder, and after completion of access to previous real time data, accessing the next real time data within the access time Tacc.

2. A reproducing apparatus for reproducing real time data from a disk-shaped information recording medium, the disk-shaped information recording medium being recorded with a real time file including the real time data so that the real time data is continuously reproduced while the real time data is reproduced according to a reproduction model, wherein:

the reproduction model includes a pickup that reads the real time data from the disk-shaped information recording medium, a buffer memory that temporarily stores the real time data read by the pickup, and a decoding module that reads the real time data from the buffer memory and processes the read real time data, and access performance of the reproduction model is provided by the following formula, $$Tacc = A \cdot dN + Trev + B$$

where Tacc is an access time that is a time required for the pickup to move from one area to another area, dN is a difference in rotational speed of the disk-shaped information recording medium before and after the movement of the pickup, Trev is a rotation waiting time at a target access position, A and B are constants; the reproducing apparatus comprising:

a data reproducing section operable to read the real time data from the disk-shaped information recording medium, a buffer memory operable to store temporarily the read real time data, and a decoder operable to read the real time data stored in the buffer memory and decode the read real time data, wherein the data reproducing section, after completion of access to previous real time data, accesses the next real time data within the access time Tacc.

* * * * *